3,524,889
ALKANOL HEMIKETAL OF 2,2,2',4',5'-PENTACHLOROACETOPHENONE
Joseph W. Sims, Modesto, Calif., assignor to Shell Oil Company, New York, N.Y., a corporation of Delaware
No Drawing. Filed Sept. 5, 1968, Ser. No. 757,765
Int. Cl. C07c *43/20*
U.S. Cl. 260—611                                2 Claims

---

ABSTRACT OF THE DISCLOSURE 2,2,2',4',5'-pentachloroacetophenone is separated from a mixture of isomeric pentachloroacetophenones containing the 2,2,2',3',6'-isomer by reacting the mixture with a lower alkanol under acidic conditions to form selectively a novel hemiketal of the 2,2,2',4',5'-isomer, separating the hemiketal from the reaction mixture, and regenerating the pure 2,2,2',4',5'-pentachloroacetophenone.

---

BACKGROUND OF THE INVENTION

Field of the invention

This invention relates to a method of separating 2,2,2',4',5'-pentachloroacetophenone from mixtures containing the 2,2,2',3',6'-isomer and other isomeric pentachloroacetophenones, and to novel compounds formed by the method.

Description of the prior art

U.S. 3,102,842 describes a process for preparing the highly insecticidally active dimethyl 1-(2,4,5-trichlorophenyl)-2-chlorovinyl phosphate by treating 2,2,2',4',5'-pentachloroacetophenone with trimethyl phosphite. In the preparation of the intermediate 2,2,2',4',5'-pentachloroacetophenone by reaction of 1,2,4-trichlorobenzene with dichloroacetyl chloride and aluminum trichloride, substantial amounts of the 2,2,2',3',6'-isomer as well as lesser amounts of other pentachloroacetophenones are formed.

The presence of the 2,2,2',3',6'-isomer is highly undesirable as it also reacts with trimethyl phosphite to form dimethyl 1-(2,3,6-trichlorophenyl)-2-chlorovinyl phosphate which has much less insecticidal activity than its 2,4,5-trichlorophenyl isomer. More importantly, however, both the dimethyl 1-(2,3,6-trichlorophenyl)-2-chlorovinyl phosphate and its acetophenone precursor exhibit a hormonal activity to broad leaf plants so that their presence in appreciable amounts limits the use of the highly insecticidal dimethyl 1-(2,4,5-trichlorophenyl)-2-chlorovinyl phosphate.

A practical method of eliminating the undesirable 2,2,2',3',6'-pentachloroacetophenone has not been available heretofore. Physical methods of separation such as by distillation and crystallization from hydrocarbon solvents have not been satisfactory because of the close physical properties of 2,2,2',4',5'- and 2,2,2',3',6'-pentachloroacetophenone.

SUMMARY OF THE INVENTION

I have now found a novel and convenient method of separating 2,2,2',4',5'-pentachloroacetophenone in high purity and high yield from its 2,2,2',3',6'-isomer and other isomeric pentachloroacetophenones. Surprisingly, it has been discovered that the 2,2,2',4',5'-isomer forms a hemiketal with lower alkanols while the 2,2,2',3',6'-isomer does not. This phenomena provides a relatively simple and useful method of separating the 2,2,2',4',5'-isomer from the undesirable 2,2,2',3',6'-isomer.

Accordingly, the present invention comprises reacting in liquid phase 2,2,2',4',5'-pentachloroacetophenone containing the 2,2,2',3',6'-isomer with a lower alkanol in the presence of catalytic amounts of a mineral acid to selectively form the lower alkanol hemiketal of the 2,2,2',4',5'-pentachloroacetophenone, separating the semiketal from the reaction mixture, and regenerating 2,2,2',4',5'-pentachloroacetophenone of high purity from the hemiketal.

The lower alkanol hemiketals of 2,2,2',4',5'-pentachloroacetophenone are novel and useful compounds which form another aspect of this invention. They are not only responsible for providing the basis for the clean separation of 2,2,2',4',5'-pentachloroacetophenone from isomeric mixtures of pentachloroacetophenones, but are also useful in other ways. For example, these hemiketals may be reacted directly with trimethyl phosphite to form the insecticide dimethyl 1-(2,4,5-trichlorophenyl)-2-chlorovinyl phosphate, thus avoiding the necessity of regenerating the acetophenone precursor.

DESCRIPTION OF THE PREFERRED EMBODIMENTS

The invention comprises reacting in liquid phase an isomeric mixture comprising 2,2,2',4',5'- and 2,2,2',3',6'-pentachloroacetophenone with a lower alkanol in the presence of a catalytic amount of a mineral acid, whereupon the 2,2,2',4',5'-isomer reacts with the lower alkanol to form a hemiketal, while the 2,2,2',3',6'-isomer remains inert. The hemiketal is easily crystallized from the reaction mixture, leaving the 2,2,2',3',6'-isomer in solution. The crystalline hemiketal is then reading regenerated to the 2,2,2',4',5'-pentachloroacetophenone and the alkanol.

The hemiketal reactions that occur and resulting novel compounds of this invention are shown by the following formula:

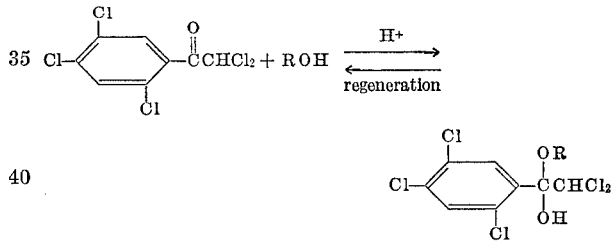

wherein R is alkyl 1 to 4 carbon atoms. Depending upon the alkanol used, the R groups may be of either straight or branched-chain configuration.

Typical hemiketals of the invention are 2,4,5-trichloro-α-(dichloromethyl)-α-methoxybenzyl alcohol, 2,4,5-trichloro-α-(dichloromethyl)-α-ethoxybenzyl alcohol, 2,4,5-trichloro-α-(dichloromethyl)-α-isopropoxybenzyl alcohol, 2,4,5-trichloro-α-(dichloromethyl)-α-butoxybenzyl alcohol and the like.

In the process of the invention the isomeric mixture of the pentachloroacetophenones is dissolved in a lower alkanol. Suitable alkanols include methanol, ethanol, n-butanol, propanol, isobutanol and the like, with methanol being preferred.

As previously described, the reaction is conducted in liquid phase. The liquid phase may be provided for by an excess of the alkanol used to form the hemiketal, or by addition of an inert organic solvent that is liquid at the reaction temperature. By inert organic solvent is meant one that does not prevent the formation of the lower alkanol hemiketal. Suitable solvents include the alkanes and cycloalkanes such as pentane, hexane, heptane, cyclopentane, cyclohexane and the like, the haloalkanes such as methyl iodide, ethyl bromide, chloroform, carbon tetrachloride and the like, the aromatic hydrocarbons such as benzene, toluene, xylene and the like, and the halogenated aromatic hydrocarbons such as chlorobenzene, o-dichlorobenzene, p-chlorotoluene and the like as well as mixtures of these solvents.

The mole ratio of alkanol to pentachloroacetophenones should be greater than one in order to insure hemiketalization of all of the 2,2,2',4',5'-isomer. When the alkanol is employed as the sole solvent, it is only necessary that it be employed in sufficient amount to insure hemiketalization and to provide an excess to insure a liquid phase reaction. In this situation the mole ratio of alkanol to pentachloroacetophenone may be as high as 2:1 or higher, with a mole ratio of about 1.2:1 preferred. When an additional solvent is used, the mole ratio of alkanol to pentachloroacetophenone may range from about 1:1 to 1.5:1 or higher, with a slight molar excess of alkanol to pentachloroacetophenone being preferred.

The relative proportion of the 2,2,2',4',5'-isomer to the 2,2,2',3',6'-isomer does not appear to be critical to the separation method of this invention. Generally, however, the 2,2,2',4',5'-isomer will be the major constituent of the isomeric mixture of pentachloroacetophenones. As prepared by the method described in U.S. 3,102,842, the mole ratio of the 2,2,2',4',5'-isomer to the 2,2,2',3',6'-isomer is usually about 8:1. The purification method of this invention, of course, does not depend on the method of preparation of the 2,2,2',4',5'-isomer. The only requirement is that there by a mixture of the two isomers.

The hemiketal formation reaction may be carried out solely in the alkanol, or the reaction may be started in the alkanol and then a quantity of an additional solvent added, or an additional solvent and alkanol combination may be used throughout the process.

Before, during, or after the addition of the isomeric mixture to the alkanol, a catalytic amount of a mineral acid is added to the reaction mixture to catalyze the formation of the hemiketal. For example, sulfuric acid, hydrochloric acid and nitric acid are suitable mineral acids, with sulfuric acid being preferred. The acid should be present in small quantities. For example, 0.001 to 0.08 mole of concentrated acid per mole of pentachloroacetophenone isomeric mixture is preferred with about 0.04 mole of acid per mole of pentachloroacetophenone being most preferred. Under some conditions of preparation of the crude 2,2,2',4',5'-pentachloroacetophenone, a mineral acid need not be added, since the reaction mixture will already be acidic.

The hemiketal reaction may be carried out at room temperature or below, with the lower limit being the temperature at which the reaction mixture freezes. Slightly elevated temperatures are permissible; however, temperatures above 100° C. should be avoided as the hemiketal tends to be unstable at higher temperatures. The reaction may be carried out at atmospheric pressure. Elevated pressures have no effect on the reaction. However, the reaction should not be conducted at a subatmospheric pressure reduced to a point at which the solvent boils off the reaction mixture.

The hemiketal is readily separated from the reaction mixture by crystallization as the temperature at which the hemiketal melts is higher than the temperature at which the 2,2,2',3',6'-pentachloroacetophenone isomer crystallizes. Therefore, the reaction mixture may be cooled to any temperature above the freezing point of the solvent which will readily induce crystallization of the hemiketal but not induce the crystallization of the 2,2,2',3',6'-pentachloroacetophenone isomer in solution. A convenient method of inducing crystallization is by slowly reducing the temperature of the solution until the hemiketal crystallizes out, filtering the crystals and washing the crystals with pentane. In the preferred process wherein methanol is the alkanol and pentane the solvent, hemiketal crystallization is carried out at temperatures between about −5° C. to 20° C. with about 0° to 10° C. being preferred.

Numerous crops of crystals may be taken from the reaction mixture when the hemiketal is somewhat soluble in the reaction mixture, such as the case when excess methanol with no additional solvent is used. However, in the case of using pentane or benzene as additional solvents, the hemiketal readily crystallizes from solution, and only one crop need be taken. The reaction mixture may be seeded with the hemiketal to aid crystallization; however, seeding is not mandatory.

Once the hemiketal crystals have been collected, the regeneration of the 2,2,2',4',5'-pentachloroacetophenone from the hemiketal is effectively accomplished by any method known in the art. For example, the hemiketal may be subjected to elevated temperatures and reduced pressures sufficient to remove the alkanol in vapor form, leaving the desired pentachloroacetophenone behind in crystalline or melted form. Or, the hemiketal may be converted back to the pentachloroacetophenone by the use of a base such as potassium hydroxide dissolved in a lower alkanol. The base need only be used in catalytic concentrations of between about 0.001 to 0.08 mole of base per mole of pentachloroacetophenone starting material. Once the hydroxyl hydrogen is removed the anion collapses to furnish the acetophenone and the alkoxide ion.

The purification method of this invention also describes the preparation of the novel lower alkanol hemiketals of the invention. These novel hemiketals may also be prepared using the pure 2,2,2',4',5'-isomer by the same general procedure.

The process and compounds of the invention are illustrated by the following example.

EXAMPLE

Four runs were carried out using the same crude isomeric mixture of pentachloroacetophenones, but varying the ratio of alkanol to 2,2,2',4',5'-pentachloroacetophenone and the temperature of crystallization. The crude mixture, prepared by reaction of 1,2,4-trichlorobenzene with dichloroacetyl chloride and aluminum trichloride, contained on a weight basis about 79% 2,2,2',4',5'-pentachloroacetophenone and 10% 2,2,2',3',6'-pentachloroacetophenone, the remainder being other isomeric pentachloroacetophenones and other by-products of the reaction.

In each run concentrated sulfuric acid and methanol were added to a flask containing the crude mixture. The reaction mixture was then cooled to 10° C., seeded with the hemiketal and stirred with a magnetic stirrer. Crystallization of the hemiketal began after about five minutes, at which time 20 milliliters of pentane was added and the stirring was continued for fifteen minutes. The mixture was then maintained at either 1° C. or 20° C. for 2.5 hours which the hemiketal crystals were collected and rinsed with 20 milliliters of pentane. The 2,2,2',4',5' - pentachloroacetophenone was regenerated from the hemiketal crystals by storing the crystals in a vacuum oven at 90° C. and 70 torr for three hours.

The results of the runs are summarized below. In each run 19 grams of the crue mixture containing about 0.0513 mole of 2,2,2',4',5'-pentachloroacetophenone and about 0.0065 mole of the 2,2,2',3',6'-isomer were used. One drop of concentrated sulfuric acid was used to catalyze the reaction.

| Run | Methanol, moles | Moles CH$_3$OH/moles PCAP [1] | Temp., °C. | Wt., grams | Purity, wt. (percent) | Yield,[2] wt. (percent) |
|---|---|---|---|---|---|---|
| 1 | 0.077 | 1.5 | 20 | 12 | 99 | 79 |
| 2 | 0.0563 | 1.1 | 20 | 13.4 | 99 | 88 |
| 3 | 0.077 | 1.5 | 1 | 13.8 | 99 | 91 |
| 4 | 0.0563 | 1.1 | 1 | 13.9 | 99 | 93 |

[1] 2,2,2',4',5',-pentachloroacetophenone.
[2] Based on weight of 2,2,2',4',5'-pentachloroacetophenone in crude mixture.

The identity of the 2,4,5-trichloro-α-(dichloromethyl)-α-methoxybenzyl alcohol, melting point 110–111° C., prepared in the above runs was confirmed by infrared analyses. In similar preparations elemental and infrared analyses were used to identify the 2,4,5-trichloro-α-(dichloromethyl)-α-methoxybenzyl alcohol.

I claim as my invention:
1. A compound of the formula
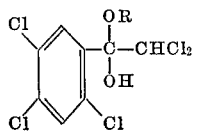
wherein R is alkyl of 1-4 carbon atoms.
2. The compound of claim 2 wherein R is methyl.
References Cited
UNITED STATES PATENTS
2,573,080  10/1951  Wilkinson et al. ____ 260—611
BERNARD HELFIN, Primary Examiner
U.S. Cl. X.R.
71—86; 260—592, 957, 999